US012770411B2

(12) United States Patent
Tamura et al.

(10) Patent No.: US 12,770,411 B2
(45) Date of Patent: Oct. 20, 2026

(54) VEHICLE LANE RECOGNITION APPARATUS

(71) Applicant: SUBARU CORPORATION, Tokyo (JP)

(72) Inventors: Yuichiroh Tamura, Tokyo (JP); Atsuki Munakata, Tokyo (JP); Takumi Funabashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 204 days.

(21) Appl. No.: 18/802,034

(22) Filed: Aug. 13, 2024

(65) Prior Publication Data

US 2025/0078533 A1 Mar. 6, 2025

(30) Foreign Application Priority Data

Aug. 31, 2023 (JP) ................................ 2023-140768

(51) Int. Cl.
*G06V 20/56* (2022.01)
*G06T 7/00* (2017.01)

(52) U.S. Cl.
CPC .......... *G06V 20/588* (2022.01); *G06T 7/0002* (2013.01); *G06T 2207/10012* (2013.01);
(Continued)

(58) Field of Classification Search
CPC ................ G06V 20/588; G06T 7/0002; G06T 2207/10012; G06T 2207/20081;
(Continued)

(56) References Cited

U.S. PATENT DOCUMENTS 4,970,653 A * 11/1990 Kenue .................. G05D 1/0246 701/28
10,867,190 B1 12/2020 Vajna et al.
(Continued)

FOREIGN PATENT DOCUMENTS

JP 2023-503536 A 1/2023

OTHER PUBLICATIONS

Zhang (VIL-100: A New Dataset and a Baseline Model for Video Instance Lane Detection, 2021). (Year: 2021).*

*Primary Examiner* — Wassim Mahrouka
(74) *Attorney, Agent, or Firm* — Rimon P.C.

(57) ABSTRACT

A vehicle lane recognition apparatus includes: an image capturer that captures an image of an external traveling environment; a disturbance determiner that compares a traveling environment image depicting the traveling environment and a comparative image depicting an equivalent traveling environment, and determines that a disturbance factor that impairs visibility is shown in the traveling environment image when a brightness average in the traveling environment image is lower than a brightness average in the comparative image and a difference between the brightness average in the traveling environment image and a brightness average in the comparative image is equal to or larger than a threshold; and a lane estimator that estimates a lane based on the traveling environment image. When estimating the lane, the lane estimator replaces information on the traveling environment image including the disturbance factor with information on the traveling environment image that is different by one or several frames.

10 Claims, 9 Drawing Sheets

(52) U.S. Cl.
CPC ............... *G06T 2207/20081* (2013.01); *G06T 2207/30168* (2013.01); *G06T 2207/30256* (2013.01)

(58) Field of Classification Search
CPC . G06T 2207/30168; G06T 2207/30256; G06T 2207/20084; G06T 2207/20182; G06T 5/50; G06T 5/60; G06T 5/77; G06T 7/73
See application file for complete search history.

(56) References Cited

U.S. PATENT DOCUMENTS

| | | | | |
|---|---|---|---|---|
| 2009/0244263 | A1* | 10/2009 | Saito | G06T 7/593 348/47 |
| 2011/0273582 | A1* | 11/2011 | Gayko | G06T 5/77 348/222.1 |
| 2019/0266418 | A1* | 8/2019 | Xu | G06V 10/44 |

* cited by examiner

VEHICLE LANE RECOGNITION APPARATUS

CROSS-REFERENCE TO RELATED APPLICATIONS

The present application claims priority from Japanese Patent Application No. 2023-140768 filed on Aug. 31, 2023, the entire contents of which are hereby incorporated by reference.

BACKGROUND

The disclosure relates to a vehicle lane recognition apparatus that recognizes a traveling lane by using an external traveling environment image.

A drive assist apparatus mounted on a vehicle such as an automobile achieves drive assist control by combining, for example, adaptive cruise control (ACC), active lane keep centering (ALKC), and emergency lane keep assist (ELKA) as appropriate.

In the drive assist control, lanes such as a current traveling lane and an adjacent lane are recognized in real time. In recent years, there is a technology for recognizing lanes based on an image depicting a traveling environment ahead of a vehicle by using an estimation model such as a neural network trained by machine learning. For example, Japanese Unexamined Patent Application Publication (Translation of PCT Application) (JP-T) No. 2023-503536 disclose a technology for detecting lane boundaries while keeping robustness against noise (disturbance) in each frame due to a wiper etc. on a windshield by inputting images in successive frames to a neural network.

SUMMARY

An aspect of the disclosure provides a vehicle lane recognition apparatus to be applied to a vehicle. The vehicle lane recognition apparatus includes an image capturer, a disturbance determiner, and a lane estimator. The image capturer is configured to capture an image of an external traveling environment. The disturbance determiner is configured to compare a traveling environment image depicting a traveling environment and a comparative image depicting the traveling environment equivalent to the traveling environment in the traveling environment image, and determine that a disturbance factor that impairs visibility is shown in the traveling environment image when a brightness average in the traveling environment image is lower than a brightness average in the comparative image and a difference between the brightness average in the traveling environment image and a brightness average in the comparative image is equal to or larger than a threshold. The lane estimator is configured to estimate a lane based on the traveling environment image by using an estimation model constructed by machine learning. The lane estimator is configured to, when estimating the lane, replace information on the traveling environment image determined as including the disturbance factor with information on the traveling environment image that is different by one frame or several frames.

An aspect of the disclosure provides a vehicle lane recognition apparatus to be applied to a vehicle. The vehicle lane recognition apparatus includes an image capturer and a processor. The image capturer is configured to capture an image of an external traveling environment. The processor is configured to compare a traveling environment image depicting the traveling environment and a comparative image depicting a traveling environment equivalent to the traveling environment in the traveling environment image, and determine that a disturbance factor that impairs visibility is shown in the traveling environment image when a brightness average in the traveling environment image is lower than a brightness average in the comparative image and a difference between the brightness average in the traveling environment image and a brightness average in the comparative image is equal to or larger than a threshold. The processor is configured to estimate a lane based on the traveling environment image by using an estimation model constructed by machine learning. The processor is configured to, when estimating the lane, replace information on the traveling environment image determined as including the disturbance factor with information on the traveling environment image that is different by one frame or several frames.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

If the estimation model is trained by machine learning about measures against disturbance factors such as a wiper as in the technology disclosed in JP-T No. 2023-503536, the size of the estimation model may increase.

It is desirable to provide a vehicle lane recognition apparatus that can recognize a lane by using a small-size estimation model without being affected by a disturbance factor.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
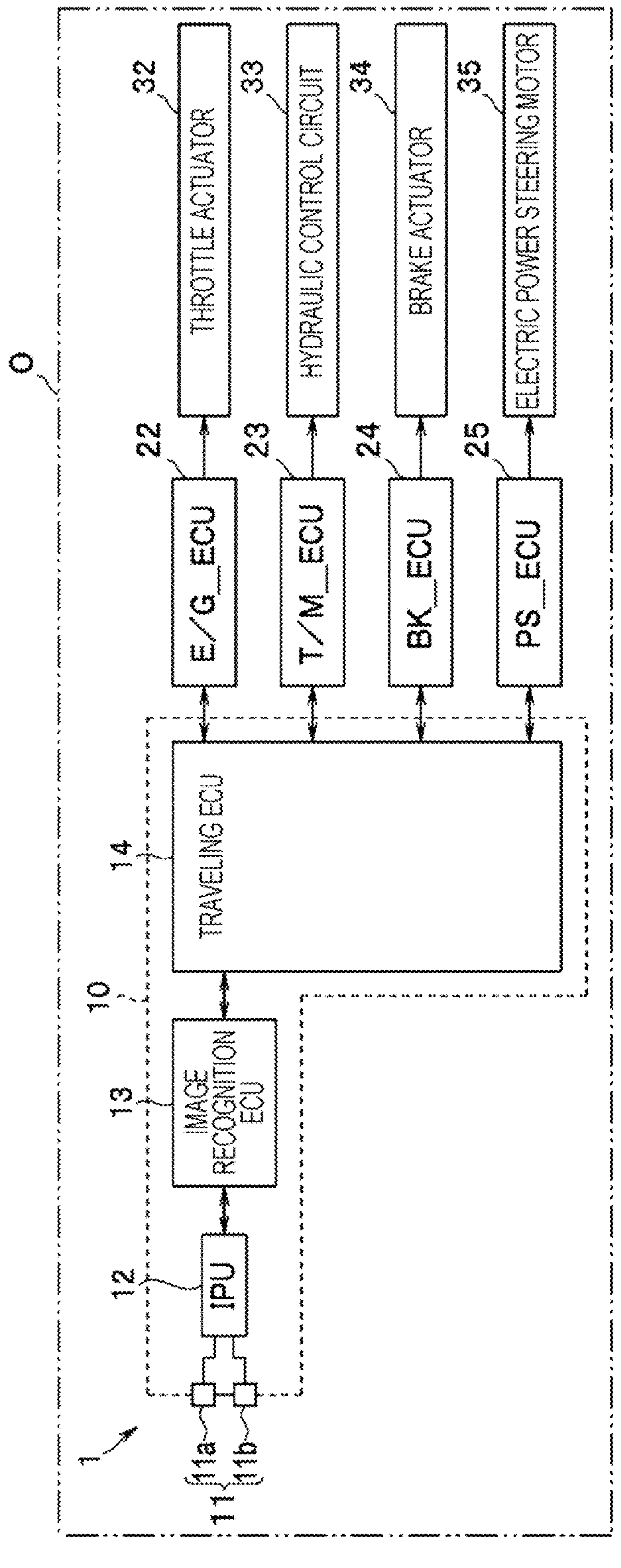
FIG. 1 illustrates a schematic configuration of a vehicle drive assist apparatus.

FIG. 1 illustrates a schematic configuration of a drive assist apparatus 1 for a vehicle according to the embodiment. As illustrated in FIG. 1, the drive assist apparatus 1 includes a camera unit 10. For example, the camera unit 10 is fixed to an upper central part of a front area in a cabin of a vehicle O.

The camera unit 10 includes a stereo camera 11, an image processing unit (IPU) 12, an image recognition unit (image recognition ECU) 13, and a traveling control unit (traveling ECU) 14. In one embodiment, the stereo camera 11 may serve as an image capturer.

The stereo camera 11 includes a main camera 11*a* and a subcamera 11*b* as sensors. In one embodiment, the main camera 11*a* may serve as a first camera, and the subcamera 11*b* may serve as a second camera. The main camera 11*a* and the subcamera 11*b* each include a CMOS imaging element etc. For example, the main camera 11*a* and the subcamera 11*b* are disposed at bilaterally symmetrical positions across the center in a vehicle width direction. The main camera 11*a* and the subcamera 11*b* perform stereoscopic imaging for a traveling environment in an external forward area from different viewpoints in every synchronous imaging period. In one embodiment, the imaging period may serve as a set timing.

The IPU 12 performs predetermined image processing for traveling environment images captured by the stereo camera 11. Thus, the IPU 12 detects various target edges of, for example, three-dimensional objects and lane lines on a road surface in the images. The IPU 12 obtains distance information from positional deviation amounts of corresponding edges in the right and left images. Thus, the IPU 12 generates image information including the distance information (distance image information).

The whole or part of the image recognition ECU 13 is a processor including hardware. For example, the processor is constituted by known components and their peripheral devices including a central processing unit (CPU), a random access memory (RAM), a read only memory (ROM), a non-volatile memory, a non-volatile storage, and a non-transitory computer readable medium. The processor serving as the image recognition ECU 13 of this embodiment further includes a data processing unit (DPU). The ROM, the non-volatile memory, the non-volatile storage, etc. prestore software programs to be executed by the CPU etc. and fixed data such as data tables. The CPU etc. reads the software programs stored in the ROM etc. and executes the software programs by loading the software programs in the RAM. The software programs implement the functions of the components and the constituent units by referring to various types of data as appropriate.

The image recognition ECU 13 estimates lanes based on a traveling environment image by using an estimation model 50 such as a neural network constructed by machine learning. Examples of the traveling environment image include an image captured by the main camera 11*a* of the stereo camera 11.

In this embodiment, the lane estimation process using the estimation model 50 is mainly performed by the DPU of the image recognition ECU 13. Thus, the image recognition ECU 13 recognizes lanes on a road including a lane where the vehicle O is traveling (current traveling lane). The lane estimation process using the estimation model 50 is described later in detail.

The image recognition ECU 13 performs predetermined pattern matching for the distance image information. Thus, the image recognition ECU 13 recognizes three-dimensional objects such as guardrails along the road, curbstones, and surrounding vehicles traveling on the road. In the recognition of three-dimensional objects, the image recognition ECU 13 recognizes, for example, types of the three-dimensional objects, distances from the three-dimensional objects, speeds of the three-dimensional objects, and relative speeds between the three-dimensional objects and the vehicle O. In this embodiment, the process for recognizing three-dimensional objects etc. using the pattern matching is mainly performed by the CPU of the image recognition ECU 13.

Various types of information recognized by the image recognition ECU 13 are output to the traveling ECU 14 as traveling environment information.

The traveling ECU 14 is a control unit that centrally controls the drive assist apparatus 1.

Various control units such as an engine control unit (E/G_ECU) 22, a transmission control unit (T/M_ECU) 23, a brake control unit (BK_ECU) 24, and a power steering control unit (PS_ECU) 25 are coupled to the traveling ECU 14 via an internal communication network such as a controller area network (CAN).

In this embodiment, the whole or part of the traveling ECU 14, the E/G_ECU 22, the T/M_ECU 23, the BK_ECU 24, and the PS_ECU 25 is a processor including hardware. For example, the processor is constituted by known components and their peripheral devices including a central processing unit (CPU), a random access memory (RAM), a read only memory (ROM), a non-volatile memory, a non-volatile storage, and a non-transitory computer readable medium. The ROM, the non-volatile memory, the non-volatile storage, etc. prestore software programs to be executed by the CPU etc. and fixed data such as data tables. The CPU reads the software programs stored in the ROM etc. and executes the software programs by loading the software programs in the RAM. The software programs implement the functions of the components and the constituent units by referring to various types of data as appropriate.

For example, a throttle actuator 32 of an electronically controlled throttle is coupled to an output side of the E/G_ECU 22. Various sensors such as an accelerator sensor (not illustrated) are coupled to an input side of the E/G_ECU 22.

The E/G_ECU 22 controls the throttle actuator 32 based on, for example, a control signal from the traveling ECU 14 or detection signals from various sensors. Thus, the E/G_ECU 22 adjusts the intake amount of an engine to generate desired engine power. The E/G_ECU 22 outputs, to the traveling ECU 14, signals of an accelerator operation amount etc. detected by various sensors.

A hydraulic control circuit 33 is coupled to an output side of the T/M_ECU 23. Various sensors such as a shift position sensor (not illustrated) are coupled to an input side of the T/M_ECU 23.

The T/M_ECU 23 controls the hydraulic control circuit 33 based on, for example, a signal of an engine torque estimated by the E/G_ECU 22 and detection signals from various sensors. Thus, the T/M_ECU 23 changes the engine power at a desired speed ratio by operating, for example, friction engagement elements and pulleys in an automatic transmission. The T/M_ECU 23 outputs, to the traveling ECU 14, signals of a shift position etc. detected by various sensors.

A brake actuator 34 for adjusting brake fluid pressures to be output to brake wheel cylinders in individual wheels is coupled to an output side of the BK_ECU 24. Various sensors such as a vehicle speed sensor, a yaw rate sensor, a brake pedal sensor, and a longitudinal acceleration sensor are coupled to an input side of the BK_ECU 24.

The BK_ECU 24 controls the brake actuator 34 based on a control signal from the traveling ECU 14 or detection signals from various sensors. Thus, the BK_ECU 24 generates, for the wheels as appropriate, braking forces for forcible braking control and yaw rate control on the vehicle O. The BK_ECU 24 outputs, to the traveling ECU 14, signals of a brake operation status, a yaw rate, a longitudinal acceleration, a vehicle speed, etc. detected by various sensors.

An electric power steering motor 35 for applying a steering torque of a rotational force from a motor to a steering mechanism is coupled to an output side of the PS_ECU 25. Various sensors such as a steering torque sensor and a steering angle sensor are coupled to an input side of the PS_ECU 25.

The PS_ECU 25 controls the electric power steering motor 35 based on a control signal from the traveling ECU 14 or detection signals from various sensors. Thus, the PS_ECU 25 generates the steering torque for the steering mechanism. The PS_ECU 25 outputs, to the traveling ECU 14, signals of a steering torque, a steering angle, etc. detected by various sensors.

The traveling ECU 14 performs drive assist control by, for example, outputting various control signals to the E/G_ECU 22, the T/M_ECU 23, the BK_ECU 24, and the PS_ECU 25.

The drive assist control is achieved by combining, for example, adaptive cruise control (ACC), active lane keep centering (ALKC), emergency lane keep assist (ELKA), and auto lane changing (ALC) as appropriate. For example, the traveling ECU 14 combines various types of control as appropriate to achieve drive assist control associated with a drive assist mode selected by a driver who drives the vehicle.

The adaptive cruise control is achieved by selectively performing follow-traveling control and constant-speed traveling control. In the adaptive cruise control, the traveling ECU 14 performs a process for registering a preceding vehicle based on traveling environment information. The traveling ECU 14 performs the follow-traveling control when a preceding vehicle is registered ahead of the vehicle O. In the follow-traveling control, the traveling ECU 14 sets a target vehicle-to-vehicle distance based on the speed of the preceding vehicle etc., and controls acceleration and deceleration to keep the set target vehicle-to-vehicle distance. The traveling ECU 14 performs the constant-speed traveling control when no preceding vehicle is registered ahead of the vehicle O. In the constant-speed traveling control, the traveling ECU 14 controls acceleration and deceleration of the vehicle O based on a target vehicle speed input by the driver.

Figure 8:
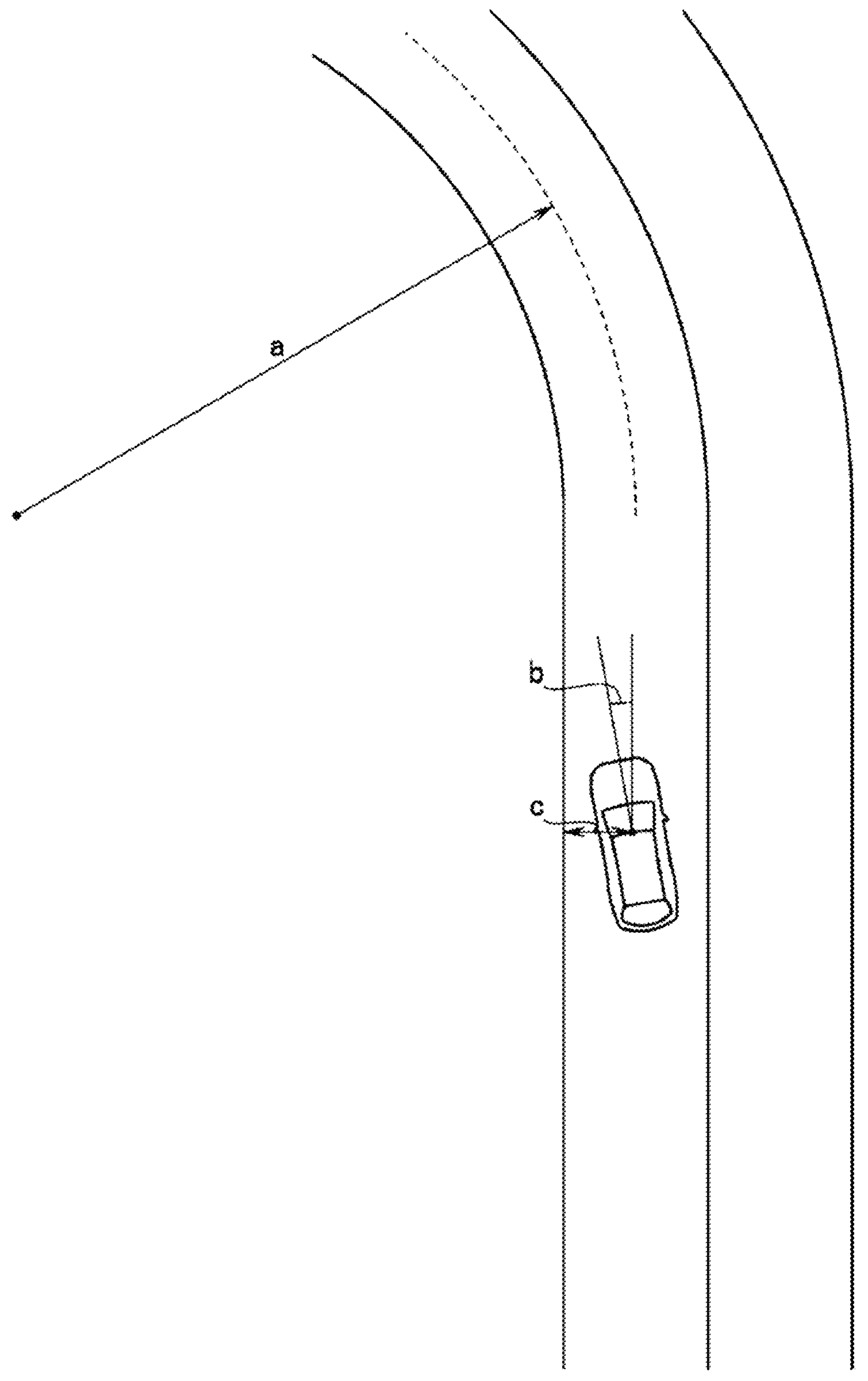
FIG. 8 illustrates a traveling state of a vehicle in a current traveling lane.

The active lane keep centering and the emergency lane keep assist are performed based on, for example, lane line information in the traveling environment information. For example, the traveling ECU 14 sets a target traveling path along right and left lane lines at the center of a current traveling lane. The traveling ECU 14 performs feedforward control and feedback control on steering based on the target traveling path. For example, assuming that "a" is a road curvature of the current traveling lane, "b" is a yaw angle of the vehicle O with respect to the current traveling lane, and "c" is a lateral position of the vehicle O in the current traveling lane as illustrated in FIG. 8, a target steering wheel angle θ in the active lane keep centering is calculated from Expression (1).

$$\theta = G_p \times c + G_i \times \int c dt + G_d \times b + G_{ff} \times a \tag{1}$$

In Expression (1), $G_p$, $G_i$, and $G_d$ are gains in the feedback control (PID control), and $G_{ff}$ is a gain in the feedforward control. In this way, the traveling ECU 14 keeps the vehicle O at the lane center.

The auto lane changing is performed based on, for example, the lane line information in the traveling environment information. The traveling ECU 14 sets a target lateral position in a lane adjacent to the current traveling lane. The traveling ECU 14 sets a target path from a target route of the vehicle O to the target lateral position. The traveling ECU 14 performs feedforward control and feedback control on steering along the target path. In this way, the traveling ECU 14 changes the lane to the adjacent lane.

A lane recognition process to be performed by the image recognition ECU 13 is described in detail.

Figure 2:
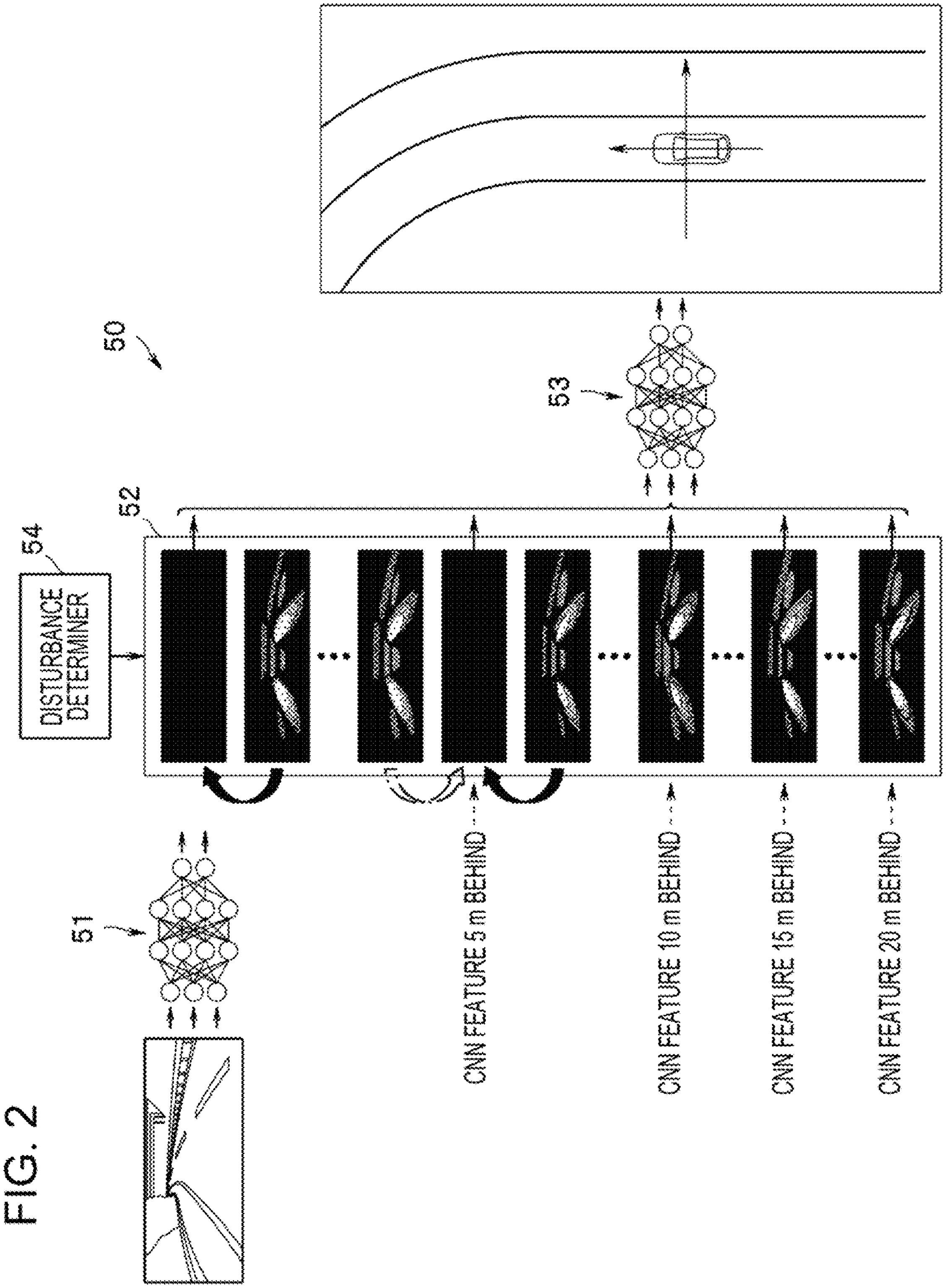
FIG. 2 illustrates a functional configuration of an estimation model.

FIG. 2 illustrates functions of the estimation model 50. The estimation model 50 includes a convolutional layer 51, a storage 52, and a fully connected layer 53. The estimation model 50 further includes a disturbance determiner 54.

For example, a traveling environment image captured by the main camera 11*a* of the stereo camera 11 is input to the disturbance determiner 54. For example, a traveling environment image captured by the subcamera 11*b* is input to the disturbance determiner 54 as a comparative image.

The main camera 11*a* and the subcamera 11*b* perform stereoscopic imaging for a traveling environment from different viewpoints at a synchronous imaging timing. Therefore, the comparative image corresponds to an image depicting a traveling environment equivalent to that in the traveling environment image captured by the main camera 11*a*.

The disturbance determiner 54 compares a brightness average in the traveling environment image and a brightness average in the comparative image. When the brightness average in the traveling environment image is lower than the brightness average in the comparative image and a difference between the brightness averages in the traveling environment image and the comparative image is equal to or larger than a threshold, the disturbance determiner 54 determines that a disturbance factor that impairs visibility is shown in the traveling environment image.

Figure 5:
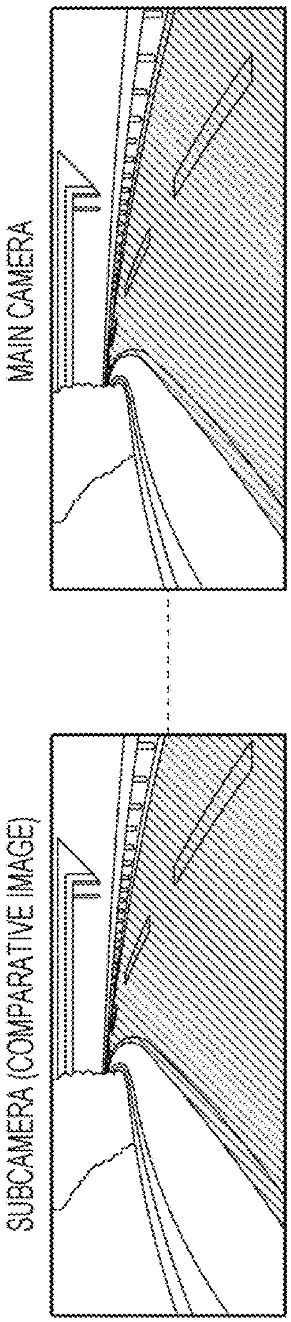
FIG. 5 illustrates areas for comparison of brightness averages in disturbance determination.
Figure 6:
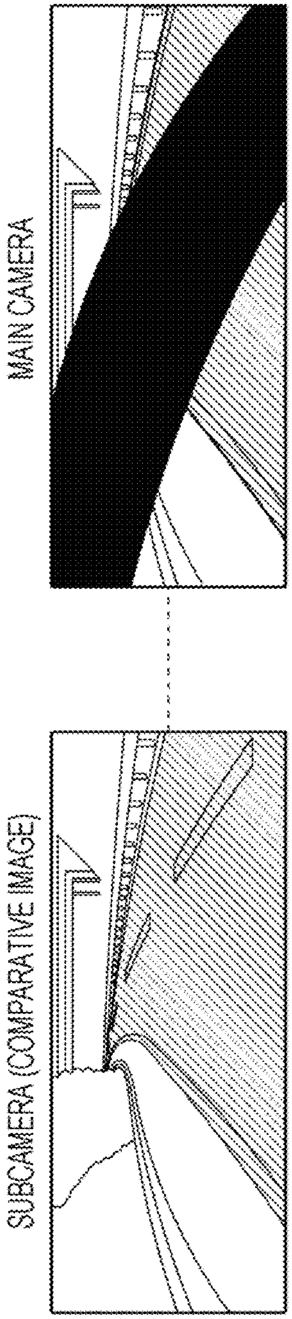
FIG. 6 illustrates areas for comparison of brightness averages in the disturbance determination.

In some embodiments, the disturbance determiner 54 compares the brightness averages within areas set in association with the lane in the traveling environment image and the lane in the comparative image (e.g., FIGS. 5 and 6). For example, the disturbance determiner 54 can set, as the areas for comparison of the brightness averages, areas associated with a lane previously estimated by the estimation model 50 in the traveling environment image and the comparative image.

Examples of the disturbance factor include a wiper for a windshield, raindrop, snow, and a bug flying around the windshield.

The convolutional layer 51 performs a convolutional process for the traveling environment image. For example, the traveling environment image captured by the main camera 11*a* is input to the convolutional layer 51. For example, the convolutional layer 51 extracts target pixels from the input traveling environment image, and generates an image showing positional information of the target pixels and relationships between the target pixels and surrounding pixels as features (feature map: e.g., FIGS. 3 and 4). In this embodiment, the convolutional layer 51 extracts, for example, pixels indicating lane lines as the target pixels. The convolutional layer 51 stores the generated feature map in the storage 52.

Figure 3:
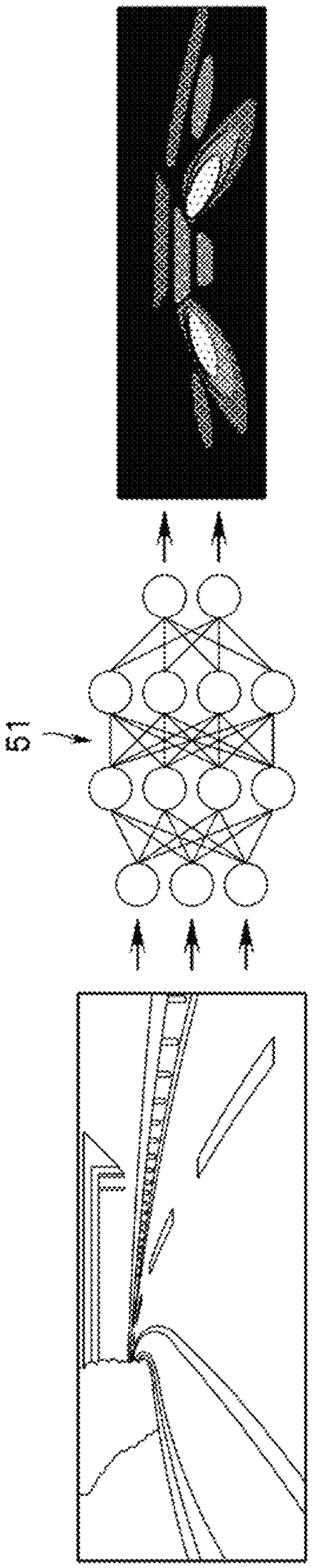
FIG. 3 illustrates a convolutional process for a traveling environment image.
Figure 4:
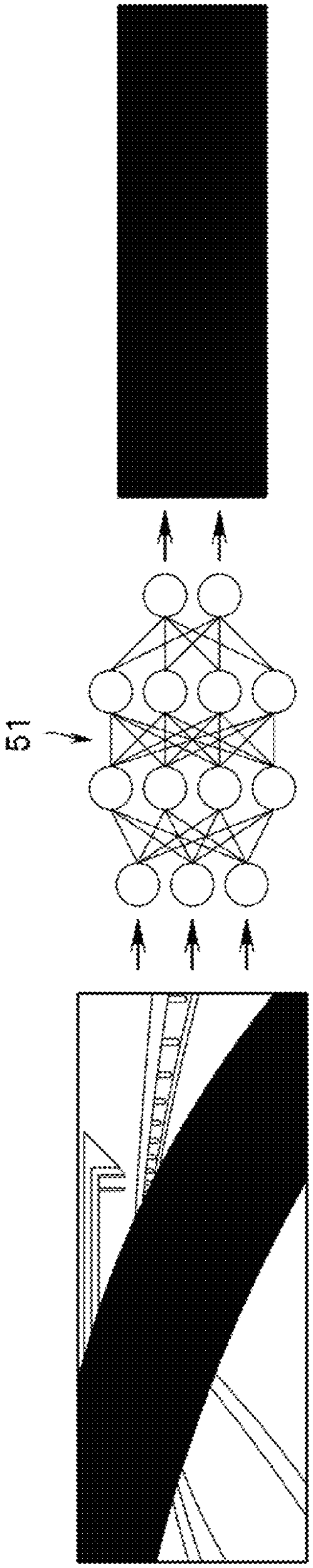
FIG. 4 illustrates the convolutional process for a traveling environment image.

FIG. 3 illustrates a feature map generated from a traveling environment image with no disturbance factor. FIG. 4 illustrates a feature map generated from, for example, a traveling environment image with a disturbance factor. In FIG. 4, a wiper is shown as an example of the disturbance factor.

The storage 52 stores, in time sequence, information on traveling environment images captured at individual set timings in a traveling section within a past set range to a current vehicle position of the vehicle O. In this embodiment, the storage 52 stores, in time sequence, feature maps calculated in individual imaging periods of the stereo camera 11 (main camera 11*a*) in, for example, a traveling section that is 20 m behind the vehicle O.

The storage 52 stores, in time sequence, results of determination on the traveling environment images by the disturbance determiner 54 in association with the feature maps.

In one embodiment, the storage 52 may serve as a memory.

The fully connected layer 53 estimates a lane by connecting, for example, a feature map that is based on a current traveling environment image and past feature maps extracted from the storage 52.

For example, the fully connected layer 53 extracts, as input information, feature maps at timings when the vehicle O traveled 5 m, 10 m, 15 m, and 20 m behind the current vehicle position from the feature maps stored in the storage 52 in time sequence.

When a feature map that is based on a traveling environment image including a disturbance factor is extracted, the fully connected layer 53 replaces the feature map including the disturbance factor with a feature map that is earlier by one frame or several frames (or later by one frame or several frames).

When the current traveling environment image includes a disturbance factor, the fully connected layer 53 replaces the current feature map with a feature map that is earlier by one frame or several frames.

The fully connected layer 53 estimates a lane by using a time sequence of the feature maps excluding the disturbance factor.

In one embodiment, the convolutional layer 51, the storage 52, and the fully connected layer 53 may serve as a lane estimator.

The lane recognition to be performed by the image recognition ECU 13 is described with reference to a flowchart of a lane recognition routine of FIG. 7. This routine is repeated by the image recognition ECU 13 at every set time (e.g., every imaging period of the stereo camera 11).

Figure 7:
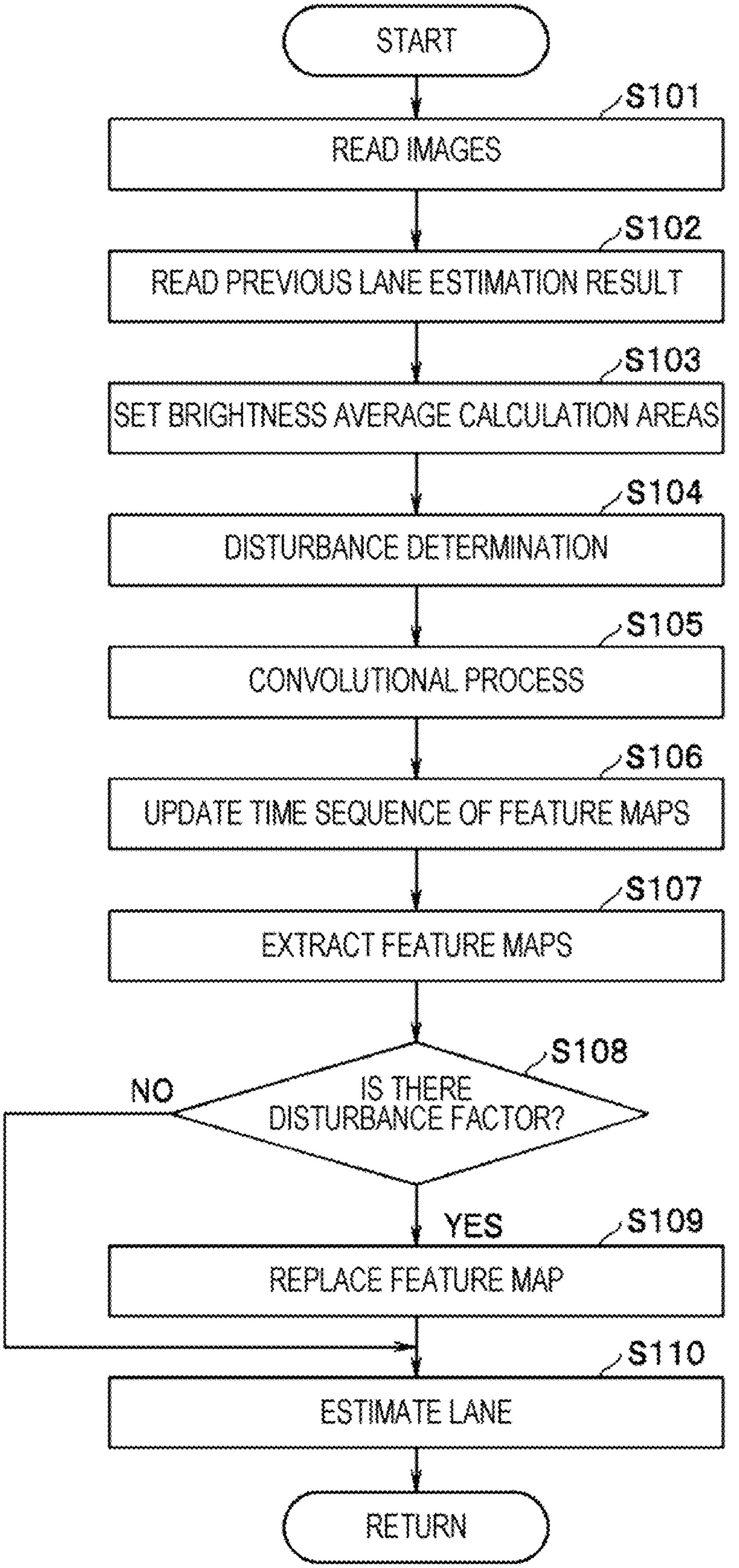
FIG. 7 is a flowchart illustrating a lane recognition routine.

In the flowchart of FIG. 7, processes of Steps S101 to S104 are mainly performed by the CPU of the image recognition ECU 13. Processes of Steps S105 to S110 are mainly performed by the DPU of the image recognition ECU 13.

When the routine is started, the image recognition ECU 13 reads images captured by the stereo camera 11 in Step S101. That is, the image recognition ECU 13 reads an image captured by the main camera 11*a* as a traveling environment image. The image recognition ECU 13 reads an image captured by the subcamera 11*b* as a comparative image.

In Step S102, the image recognition ECU 13 reads an estimation result about a lane previously estimated by using the estimation model 50.

In Step S103, the image recognition ECU 13 sets brightness average calculation areas in the traveling environment image and the comparative image (e.g., FIGS. 5 and 6) by using the previous lane estimation result.

In Step S104, the image recognition ECU 13 calculates a brightness average in the area set in the traveling environment image and a brightness average in the area set in the comparative image. The image recognition ECU 13 determines whether the traveling environment image includes a disturbance factor by comparing the brightness averages in the traveling environment image and the comparative image.

In Step S105, the image recognition ECU 13 performs the convolutional process using the convolutional layer 51 for the traveling environment image currently read from the main camera 11*a*. That is, the image recognition ECU 13 inputs the traveling environment image to the convolutional layer 51 of the estimation model 50 to generate a feature map of the traveling environment image.

In Step S106, the image recognition ECU 13 updates a time sequence of feature maps stored in the storage 52. That is, the image recognition ECU 13 stores the feature map that is based on the currently read traveling environment image in the storage 52 together with a result of the determination about the disturbance factor in the traveling environment image. The image recognition ECU 13 deletes, from the storage 52, a feature map obtained at a timing earlier than a timing when the vehicle O traveled 20 m behind the current vehicle position.

In Step S107, the image recognition ECU 13 extracts feature maps at timings when the vehicle O traveled 5 m, 10 m, 15 m, and 20 m behind the current vehicle position from the feature maps stored in the storage 52 in time sequence.

In Step S108, the image recognition ECU 13 checks whether the current feature map and the extracted feature maps include a disturbance factor.

When determination is made in Step S108 that none of the feature maps includes a disturbance factor, the image recognition ECU 13 proceeds to Step S110.

When determination is made in Step S108 that one or more of the feature maps includes a disturbance factor, the image recognition ECU 13 proceeds to Step S109.

In Step S109, the image recognition ECU 13 replaces the feature map including the disturbance factor with a feature map that is earlier by one frame or several frames (or later by one frame or several frames).

In Step S110 subsequent to Step S108 or S109, the image recognition ECU 13 the image recognition ECU 13 estimates a lane by using the fully connected layer 53, and then terminates the routine. That is, the image recognition ECU 13 estimates a lane by inputting the current feature map and the feature maps extracted from the storage 52 (when the disturbance factor is included, the feature map after replacement) to the fully connected layer 53.

According to the embodiment, when estimating a lane based on the traveling environment image by using the estimation model 50 constructed by machine learning, the image recognition ECU 13 compares the traveling environment image and the comparative image showing a traveling environment equivalent to that in the traveling environment image, and determines that a disturbance factor that impairs visibility is shown in the traveling environment image when the brightness average in the traveling environment image is lower than the brightness average in the comparative image and the difference between the brightness averages in the traveling environment image and the comparative image is equal to or larger than the threshold. The image recognition ECU 13 replaces information on the traveling environment image determined as including the disturbance factor with information on a traveling environment image that is different by one frame or several frames. Thus, the lane can be recognized by using the small-size estimation model 50 without being affected by the disturbance factor.

That is, the image recognition ECU 13 performs a process different from the process using the estimation model 50 as the measure against the case where the traveling environment image includes the disturbance factor. Thus, the estimation model 50 need not be trained about the measures against the disturbance factors such as a wiper. Accordingly, accurate lane estimation can be achieved by using the small-size estimation model 50.

It is unlikely that the disturbance factor such as a wiper is shown in traveling environment images of successive frames. Information on a stationary object such as a lane in the traveling environment image has an infinitesimal change in one frame or between several frames. Based on these facts, the image recognition ECU 13 can achieve good lane estimation by simply replacing the information on the traveling environment image determined as including the disturbance factor with the information on the traveling environment image that is different by one frame or several frames.

In general, the brightness of the area including the disturbance factor such as a wiper in the traveling environment image is much lower than the brightness of the other area. Based on this fact, whether the disturbance factor is shown is determined by comparing the brightness averages in the traveling environment image and the comparative image. Thus, whether the disturbance factor is shown can be determined by the simple arithmetic processing.

The image recognition ECU 13 stores the feature maps generated by the convolutional process for the traveling environment images in the storage 52 in time sequence. The image recognition ECU 13 estimates a lane by fully connecting the current feature map and the feature maps extracted from the storage 52. Thus, the lane in a wide area around the vehicle O can be estimated accurately. By storing the feature maps obtained by compressing the traveling environment images through the convolutional process, the information on the traveling environment images can be held with a smaller capacity than in a case where the traveling environment images are stored.

The image recognition ECU 13 sets areas associated with a previously estimated lane in the traveling environment image and the comparative image as the areas for calculation of the brightness averages. The image recognition ECU 13 determines whether a disturbance factor is shown in the traveling environment image by comparing the brightness averages in these areas. Even if a disturbance factor is shown in the traveling environment image, the traveling environment image including the disturbance factor shown in an area other than the area overlapping the lane can effectively be used for the lane estimation.

The image recognition ECU 13 uses an image captured by one of the cameras (e.g., the main camera 11*a*) of the stereo camera 11 as the traveling environment image for the lane estimation, and uses an image captured by the other of the cameras (e.g., the subcamera 11*b*) as the comparative image. It is unlikely that the disturbance factor such as a wiper is simultaneously shown in the main camera 11*a* and the subcamera 11*b*. Based on this fact, the traveling environment image and the comparative image showing the equivalent traveling environments can easily be acquired at the same timing.

Figure 9:
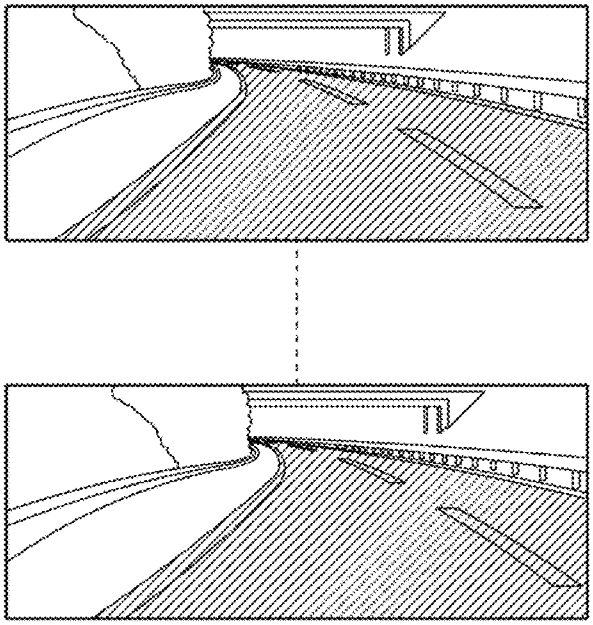
FIG. 9 illustrates areas for comparison of brightness averages in disturbance determination according to a modification.
Figure 10:
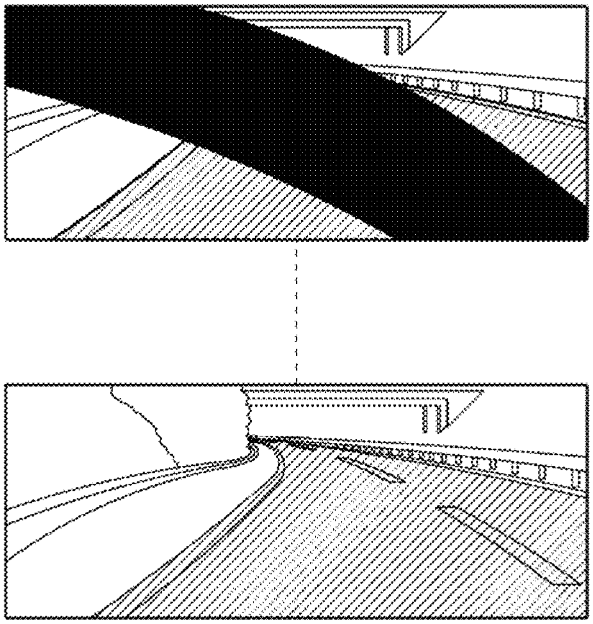
FIG. 10 illustrates areas for comparison of brightness averages in the disturbance determination according to the modification.

In the embodiment described above, the traveling environment image and the comparative image are simultaneously acquired by the stereoscopic imaging for the traveling environment, but the acquisition of the comparative image is not limited thereto. For example, as illustrated in FIGS. 9 and 10, a traveling environment image that is earlier by one frame or several frames may be used as the comparative image. The use of the traveling environment image that is earlier by one frame or several frames as the comparative image is effective in a case where the traveling environment is imaged by the stereo camera and in a case where the traveling environment is imaged by a monocular camera.

The processors serving as the image recognition ECU 13, the traveling ECU 14, the E/G_ECU 22, the T/M_ECU 23, the BK_ECU 24, and the PS_ECU 25 may be implemented by a semiconductor chip such as a field programmable gate array (FPGA). The components and the constituent units may be implemented by electronic circuits.

The software programs may entirely or partially be recorded as computer program products in a non-transitory computer readable medium such as a portable sheet medium typified by a flexible disk, a CD-ROM, or a DVD-ROM, a card memory, a hard disk drive (HDD), or a solid state drive (SSD).

The embodiment of the disclosure is not limited to the embodiment described above, and various modifications may be made without departing from the gist in the implementation. The embodiment includes various aspects of the disclosure that may be extracted by any appropriate combination of the disclosed constituent elements.

Some of the constituent elements in the embodiment may be omitted as long as the problems described above can be solved and the effects described above can be attained.

The image recognition ECU 13 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the image recognition ECU 13. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle lane recognition apparatus to be applied to a vehicle, the vehicle lane recognition apparatus comprising:

an image capturer configured to capture an image of an external traveling environment;

a disturbance determiner configured to:

compare a traveling environment image depicting the traveling environment and a comparative image depicting a traveling environment equivalent to the traveling environment in the traveling environment image; and determine that a disturbance factor that impairs visibility is shown in the traveling environment image when a brightness average in the traveling environment image is lower than a brightness average in the comparative image and a difference between the brightness average in the traveling environment image and the brightness average in the comparative image is equal to or larger than a threshold; and a lane estimator configured to estimate a lane based on the traveling environment image by using an estimation model constructed by machine learning, wherein the lane estimator is configured to:

generate a current feature map by performing a convolutional process for the traveling environment image;

cause a memory to store, in time sequence, feature maps generated by the convolutional process for traveling environment images captured at individual set timings, each of the feature maps being stored together with a result of the determination by the disturbance determiner for a corresponding one of the traveling environment images;

extract one or more feature maps from the memory;

when the current feature map is based on the traveling environment image determined to show the disturbance factor, replace the current feature map with a feature map generated from a traveling environment image captured one frame or several frames earlier than the traveling environment image determined to show the disturbance factor;

when an extracted feature map among the one or more feature maps extracted from the memory is based on a traveling environment image determined to show the disturbance factor, replace the extracted feature map with another feature map generated from another traveling environment image captured one frame or several frames earlier or later than the traveling environment image determined to show the disturbance factor; and estimate the lane by using the current feature map and the one or more feature maps obtained after performing any replacement of the current feature map and any replacement of the extracted feature map.

2. The vehicle lane recognition apparatus according to claim 1, wherein the memory is included in the lane estimator and is configured to store, in time sequence, the feature maps generated by the convolutional process for the traveling environment images captured at the individual set timings in a traveling section within a past set range from a current vehicle position of the vehicle.

3. The vehicle lane recognition apparatus according to claim 1, wherein the disturbance determiner is configured to compare the brightness average in a first area in the traveling environment image and the brightness average in a second area in the comparative image, the first area and the second area being set in association with the lane previously estimated by the lane estimator.

4. The vehicle lane recognition apparatus according to claim 1, wherein the image capturer is a stereo camera including a first camera and a second camera configured to capture images of the traveling environment from different viewpoints in synchronization with each other, wherein the traveling environment image is an image captured by the first camera, and wherein the comparative image is an image captured by the second camera.

5. The vehicle lane recognition apparatus according to claim 1, wherein the comparative image is another traveling environment image captured one frame or several frames earlier than the traveling environment image determined to show the disturbance factor.

6. A vehicle lane recognition apparatus to be applied to a vehicle, the vehicle lane recognition apparatus comprising:

an image capturer configured to capture an image of an external traveling environment;

a memory; and a processor, wherein the processor is configured to:

compare a traveling environment image depicting the traveling environment and a comparative image depicting a traveling environment equivalent to the traveling environment in the traveling environment image, and determine that a disturbance factor that impairs visibility is shown in the traveling environment image when a brightness average in the traveling environment image is lower than a brightness average in the comparative image and a difference between the brightness average in the comparative image and the brightness average in the traveling environment image is equal to or larger than a threshold, estimate a lane based on the traveling environment image by using an estimation model constructed by machine learning;

generate a current feature map by performing a convolutional process for the traveling environment image;

cause the memory to store, in time sequence, feature maps generated by the convolutional process for traveling environment images captured at individual set timings, each of the feature maps being stored together with a result of the determination by the processor for a corresponding one of the traveling environment images;

extract one or more feature maps from the memory;

when the current feature map is based on the traveling environment image determined to show the disturbance factor, replace the current feature map with a feature map generated from a traveling environment image captured one frame or several frames earlier than the traveling environment image determined to show the disturbance factor;

when an extracted feature map among the one or more feature maps extracted from the memory is based on a traveling environment image determined to show the disturbance factor, replace the extracted feature map with another feature map generated from another traveling environment image captured one frame or several frames earlier or later than the traveling environment image determined to show the disturbance factor, and estimate the lane by using the current feature map and the one or more feature maps after performing any replacement of the current feature map and any replacement of the extracted feature map.

7. The vehicle lane recognition apparatus according to claim 1, wherein the one or more feature maps extracted from the memory include feature maps generated from traveling environment images captured when the vehicle was located at respective predetermined distances behind a current vehicle position of the vehicle.

8. The vehicle lane recognition apparatus according to claim 1, wherein the lane estimator is configured to delete, from the memory, a feature map obtained before a timing at which the vehicle was located at a predetermined distance behind a current vehicle position of the vehicle.

9. The vehicle lane recognition apparatus according to claim 1, wherein each of the feature maps indicates positional information of target pixels extracted from a corresponding one of the traveling environment images and relationships between the target pixels and surrounding pixels as features.

10. The vehicle lane recognition apparatus according to claim 9, wherein the target pixels are pixels indicating lane lines.

* * * * *